Figure 1:
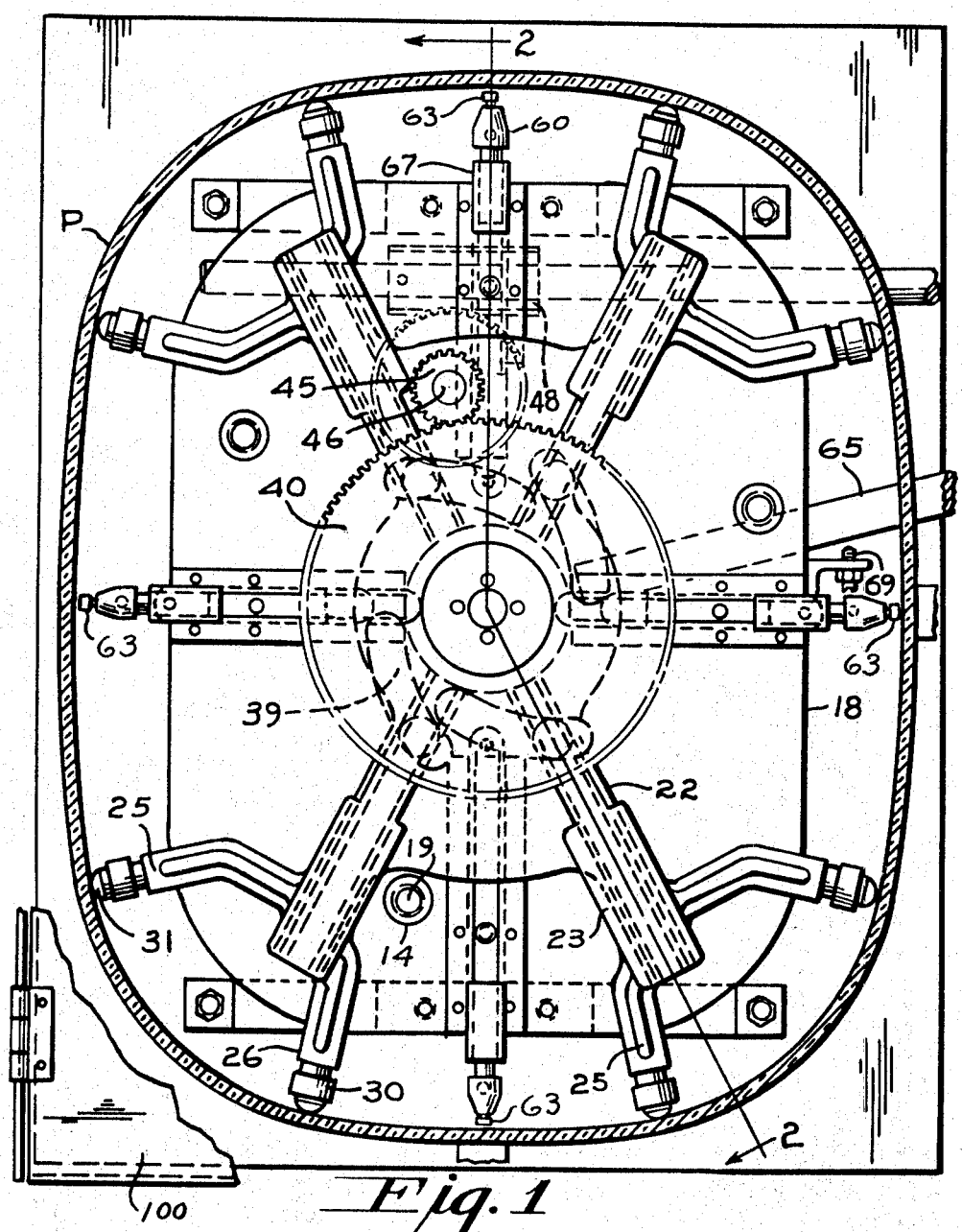

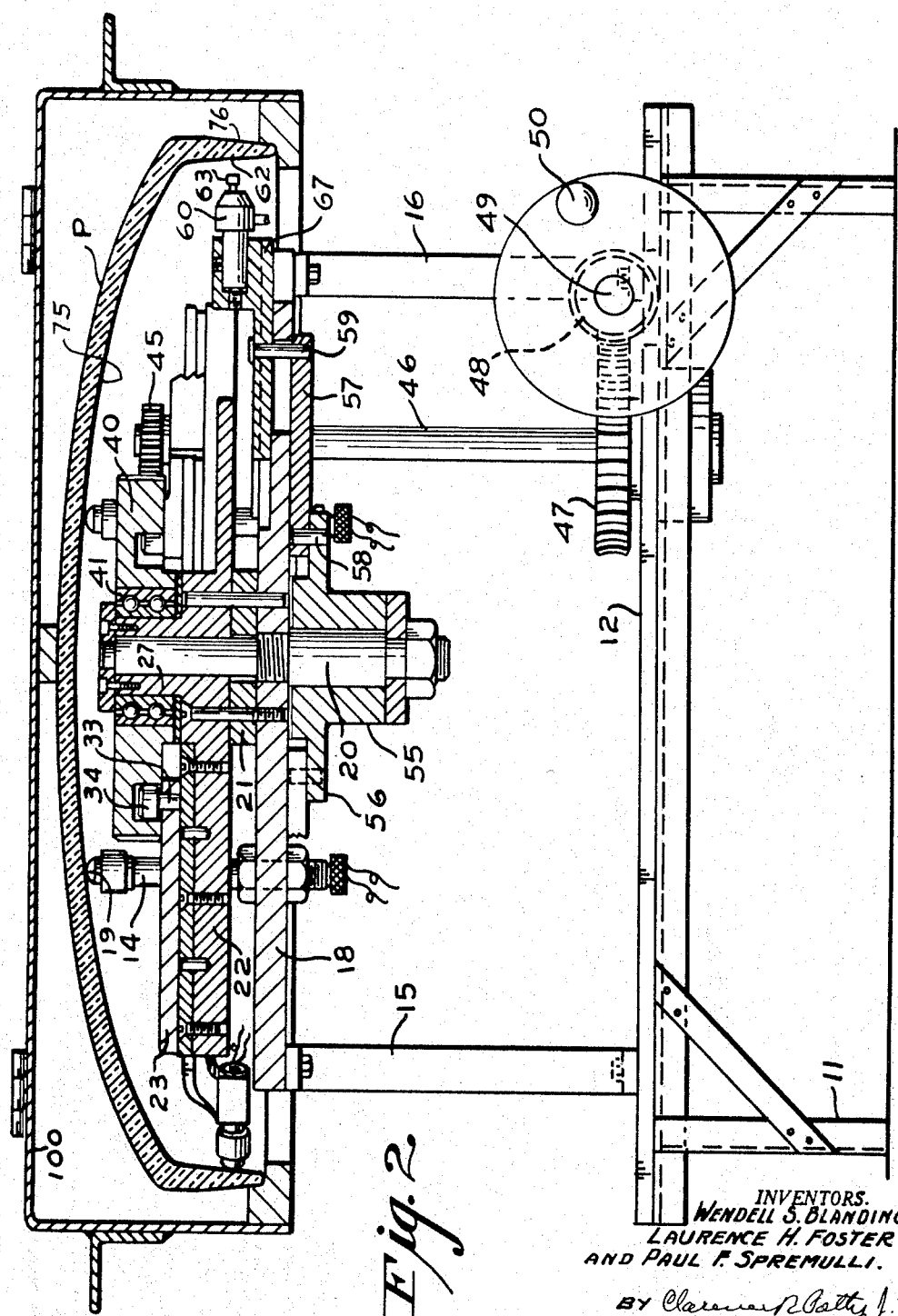

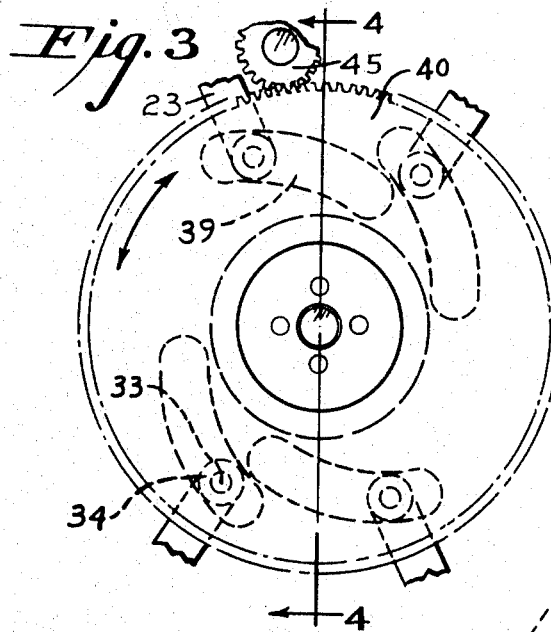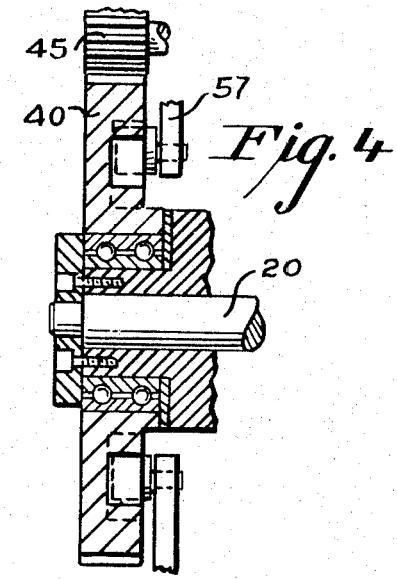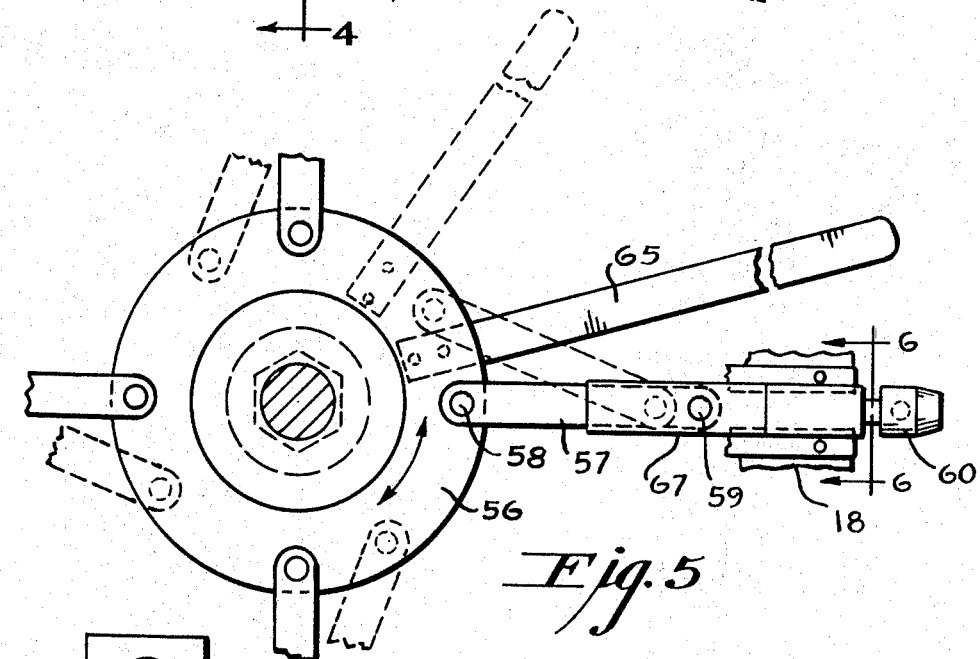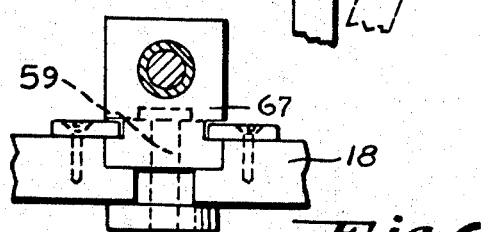

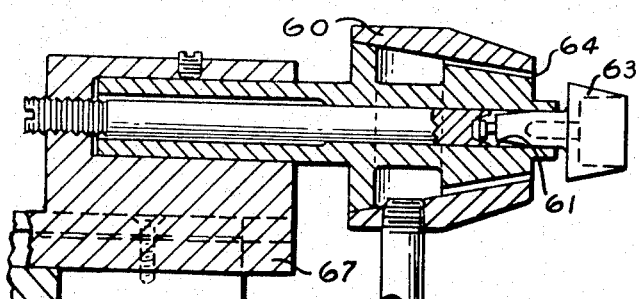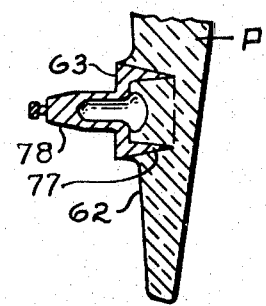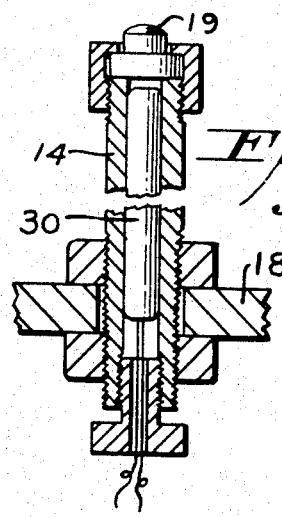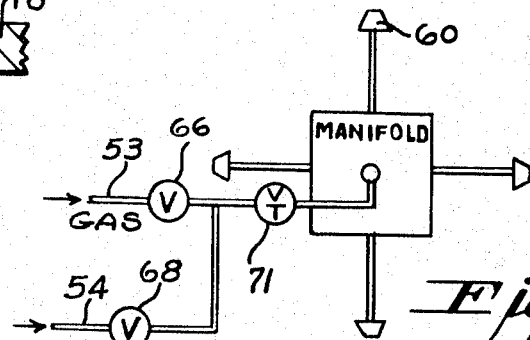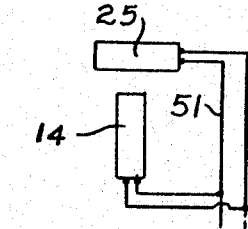

United States Patent Office 3,359,444
Patented Dec. 19, 1967

3,359,444
METAL INSERTS FOR USE IN THE WALL OF GLASS ENVELOPES FOR THE SUPPORT OF ELECTRODES
Wendell S. Blanding, Painted Post, Laurence H. Foster, Corning, and Paul F. Spremulli, Elmira, N.Y., assignors to Corning Glass Works, Corning, N.Y., a corporation of New York
Application May 29, 1959, Ser. No. 816,953, now Patent No. 3,021,643, dated Feb. 20, 1962, which is a division of application Ser. No. 591,179, June 13, 1956, now Patent No. 2,949,702, dated Aug. 23, 1960. Divided and this application Dec. 19, 1961, Ser. No. 160,479
8 Claims. (Cl. 313—64)

This invention relates to metal inserts suitable for use as supports in the cavity defining wall surfaces of hollow glass articles. By way of example, such an article may be a skirted or walled panel serving as a viewing screen for an all-glass television picture tube wherein an aperture mask or the like is held within the cavity of the viewing screen.

This application is a division of our co-pending application Ser. No. 816,953, filed May 29, 1959, now Patent No. 3,021,643, granted Feb. 20, 1962 which is a division of Ser. No. 591,179, filed June 13, 1956, now Patent No. 2,949,702 granted Aug. 23, 1960.

According to the invention an apparatus is provided for supporting a number of cup-like metal inserts or members having their free wall edges adapted for being pressed into appropriately selected inner surface regions of the viewing screen wall or skirt after such inserts have been suitably heated and the glass in such regions heated to a workable temperature by flames from burners associated with the apparatus. Moreover, the inserts are made hollow to enable them to entrap air therein during the time that they are being forced into the softened glass. This entrapped air becomes highly heated and builds up pressure within an insert; and is made available by the apparatus while the glass is still workable, to pneumatically pull the seal to give the glass the contour known to provide a strong and reliable seal along its lines of juncture with the insert.

Preparatory to the sealing of metal inserts or members in a glass panel, to avoid danger of thermal shock and possible breakage thereof during the process, it is preferable that the panels be preheated to the annealing temperature of the glass at least in the areas where the seals are to be made. If the entire panel is to be preheated such preheating can conveniently be effected in a suitable oven. If only the regions of the panel wall to be occupied by the inserts are to be preheated, broad heating flames may be directed towards the respective sealing regions for a suitable period before associating the panel with the sealing apparatus. Also to avoid thermal shock to the panel, applicants prefer to heat the respective parts of the apparatus that support and/or properly orient the panel with respect to associated mechanism for embedding the inserts into the glass. This is accomplished by electrically heating such parts. It is also essential that the panel be annealed after the inserts have been sealed therein, and this, of course, can be readily done in a suitable oven.

In carrying out the invention applicants prefer to place the panel at room temperature in a suitable container that extends only about the panel side wall or skirt and its front surface. With such a container structure the panel may be kept enclosed therein throughout the preheating, sealing, and annealing cycle and allowed to again cool to a temperature at which it can be safely removed to room atmosphere.

For a better understanding of the invention reference is made to the accompanying drawings wherein:
FIG. 1 is a sectional plan view of an apparatus embodying the invention showing the panel cover broken away for the most part and a sectional view of a panel taken through its side wall or skirt.
FIG. 2 is a sectional view of the apparatus and of a panel thereon taken generally along line 2—2 of FIG. 1.
FIGS. 3 and 4 are views of fragmentary portions of the apparatus having to do with laterally orienting a panel thereon.
FIG. 5 is a view of fragmentary portions of the apparatus having to do with locally heating the metal inserts and the panel wall and the embedding of the inserts in the panel wall.
FIG. 6 is a view taken on line 6—6 of FIG. 5.
FIG. 7 is an enlarged view of a fragment of the apparatus also on line 2—2 of FIG. 1 and including a side elevational view of a metal insert associated therewith.
FIG. 8 is a sectional view of a panel fragment and of an insert sealed therein.
FIG. 9 is a sectional view of one of the panel supporting elements.
FIG. 10 is a diagrammatic illustration of the gaseous fuel heating system of the apparatus.
FIG. 11 is a diagrammatic view illustrating the electric heating arrangement employed.

Referring to the drawings in detail, the sealing apparatus embodies a suitable table 11 provided with a top 12. Supported on top 12, by means of brackets such as 15 and 16 is a base plate 18 having a number of up-standing posts such as 14 (FIGS. 1, 2, and 9) passing therethrough and provided at their free ends with panel supporting carbon buttons such as 19. Plate 18 also has a centrally disposed post 20 threaded therethrough. Arranged upon the upwardly projecting portion of post 20 is a spacer washer 21 and thence a generally X-shaped support 22 adapted to accommodate four diagonal slides such as 23 (FIGS. 1 and 2). Each such slide has two branches, such as 25 and 26, at its outer end. Each branch carries a cartridge similar to 30 (FIG. 9) containing an electric heating element and is provided with a glass engaging button such as 31 of carbon. As illustrated in FIGS. 2 and 3, the inner end of each slide, such as 23, is provided with an aperture occupied by a pin 33 carrying a cam roller 34. Each such cam roller occupies an arcuate slot such as 39 in a cam gear 40 turnable about a bearing 41 (FIG. 2) arranged about the hub 27 of the support 22. The cam gear 40 is turned by means of a pinion 45 in mesh therewith and carried on the upper end of a vertical shaft 46 passing down through a suitable bearing mounted in the table top 12. Shaft 46, just above the table top 12 is provided with a worm wheel 47 in mesh with a worm 48 carried by a horizontal shaft 49 equipped with a hand wheel and crank 50. As will be understood, by turning crank 50 the slides such as 23 may be advanced to cause branches such as 25 and 26 to engage their buttons, such as 31, with the wall of a panel such as P to shift it to a precise desired position.

On the portion of the post 20 depending from the underside of plate 18 there is pivotally arranged a cam embodying a hub 55 and a flange 56. Coupled to flange 56 by means of links such as 57 and pins 58 and 59 are burner supporting slides such as 67 (FIGS. 1, 2, and 7) arranged in ways (FIG. 6) formed in plate 18. Each of these slides at its outer end carries a burner assembly such as 60 having a metal insert or member receiving pocket 61 surrounded by gaseous fuel outlets such as 64 for directing flames toward a member such as 63 occupying such pocket and toward the adjacent panel wall surface 62 of the panel into which the element is to be sealed.

A lever 65 (FIGS. 1 and 5) at one end is secured to the cam flange 56 and enables the cam to be turned to advance the burners toward the panel wall and to force the inserts such as 63 into sealing relation therewith after proper heating of the panel wall has been effected. Lever 65 engages an adjustable stop 69 (FIG. 1) on plate 18 when the inserts have been advanced a predetermined depth into the panel and on restoration backs the burners off the sealed-in inserts to permit the bubble of air entrapped in the cavity of insert 63 to give a slight outward thrust to the insert and thus impart a contour to the line of juncture of the glass and metal found to be of greatest possible strength.

As diagrammatically illustrated in FIG. 10 the respective burners such as 60 receive fuel from a manifold supplied by gas and oxygen lines 53 and 54, respectively, via suitable regulating valves 66 and 68 and a throttle valve 71. As will be understood valve 71 may be manipulated in any desired manner to suitably regulate the burner flames as the lever 65 is manipulated to advance the inserts towards and into the panel wall.

As diagrammatically illustrated in FIG. 11 posts such as 14 and the slide branches such as 25 have their heating elements bridged across suitable heating current supply conductors 51 and 52 connected to the X and Y terminals of a suitable heating current source through a switch 70.

It has hereinbefore been stated that the panels are preferably preheated before sealing in the metal inserts and is annealed thereafter. Conveniently, a panel, such as P, is inserted in a metal container 100 which leaves the interior of the panel exposed and available to the pin sealing apparatus so that the panel may be retained in such container throughout its preheating, sealing, and annealing treatments.

The method of sealing an insert into a panel may be briefly summarized as follows: A panel is suitably preheated and placed upon the apparatus. The crank 50 is then turned to laterally orient the panel to a predetermined exact position with respect to the burners carrying the inserts. Valve 71 is then actuated and flames from the burners suitably regulated. When the panel wall regions opposite the respective burners have been heated to a softened or workable temperature the valve 71 is closed and the handle 65 actuated to advance the burners towards such regions and to force the inserts carried by them into the softened glass a distance determined by the setting of stop 69. While the glass is still workable lever 65 is restored to its initial position thus freeing the inserts for movement in an outward direction under the influence of air pressure developed within the insert cavities during the sealing operation, thus effectively pulling the seals.

Although a particular form of sealing apparatus has been herein shown and described and only one specific form of insert shown, modifications of such structures are believed to be well within the spirit and scope of the invention as claimed.

We claim:

1. A face plate member for a cathode-ray tube envelope comprising a hollow disk-shaped enclosing part having a viewing portion and a surrounding flange portion, a series of at least three metallic stud-like elements mounted in spaced-apart relationship interiorly within the flange portion, each of said elements having a hollow cup-like mounting portion at least partially embedded within the glass of said flange portion and an inwardly-projecting seating portion extending from the flange surface adapted to retain an electronic element within said face plate.

2. The face plate member for a cathode-ray tube envelope in accordance with claim 1, each of said stud-like elements comprised of a metal adapted to be thermally sealed to glass and a seating surface for retaining an electronic element in precise alignment with the viewing portion.

3. A glass body having sealed therein at least one metallic stud-like element having a hollow cup-like base portion closed at its outer end and at least partially embedded in said glass body and having air entrapped therein, and a seating portion projecting outwardly from the said closed end of said base portion.

4. A face plate member for a cathode-ray tube envelope comprising a hollow disk-shaped enclosing part having a viewing portion and a surrounding flange portion, a series of at least three metallic stud-like elements mounted in spaced-apart relationship interiorly within the flange portion, each of said elements having a hollow mounting portion at least partially embedded within the glass of said flange portion and an inwardly-projecting seating portion extending from the flange surface adapted to retain an electronic element within said face plate.

5. The face plate member for a cathode-ray tube envelope in accordance with claim 4, each of said stud-like elements comprised of a metal adapted to be thermally sealed to glass and a seating surface for retaining an electronic element in precise alignment with the viewing portion.

6. A glass body having sealed therein at least one metallic stud-like element having a hollow base portion closed at its outer end and at least partially embedded in said glass body and having air entrapped therein, and a seating portion projecting outwardly from the said closed end of said base portion.

7. A glass-metal article comprising a relatively thick wall of glass and a cup-like metal insert having its cavity bordering edge embedded therein, said cup having air entrapped within its cavity.

8. A glass body having sealed therein at least one stud-like element having a hollow base portion closed at its outer end and at least partially embedded in said glass body and having air entrapped therein.

References Cited

UNITED STATES PATENTS 3,004,182  10/1961  Pfaender _____ 313—64

JAMES W. LAWRENCE, *Primary Examiner.*

ARTHUR GAUSS, GEORGE WESTBY, *Examiners.*

C. R. CAMPBELL, *Assistant Examiner.*